Nov. 10, 1936.   L. W. DYER   2,060,492
ELECTRICAL APPARATUS
Filed April 24, 1934   3 Sheets-Sheet 1

WITNESSES:
E. C. Keiding
Paul D. Glaister

INVENTOR
Lloyd W. Dyer
BY F. W. Lyle
ATTORNEY

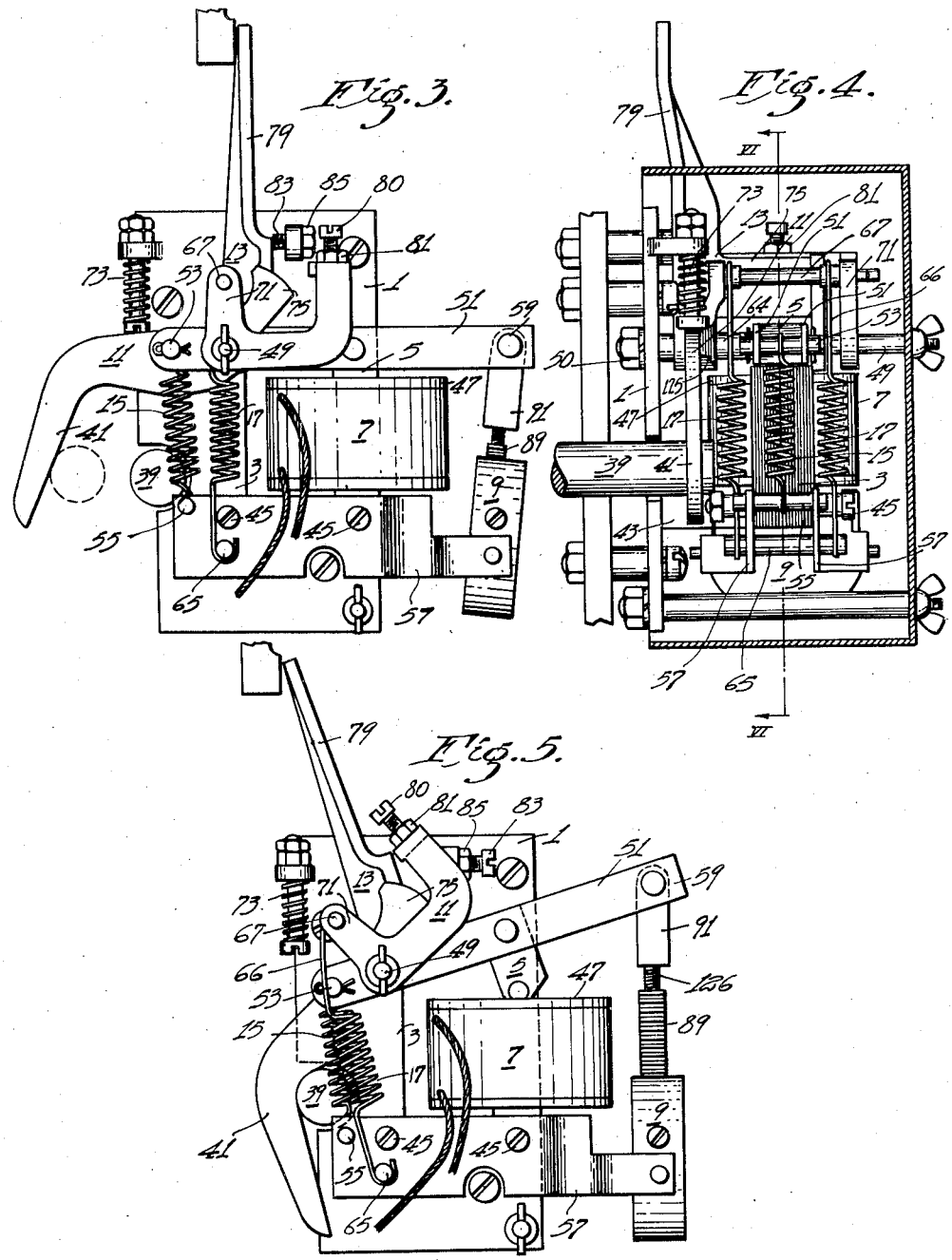

Nov. 10, 1936.  L. W. DYER  2,060,492
ELECTRICAL APPARATUS
Filed April 24, 1934
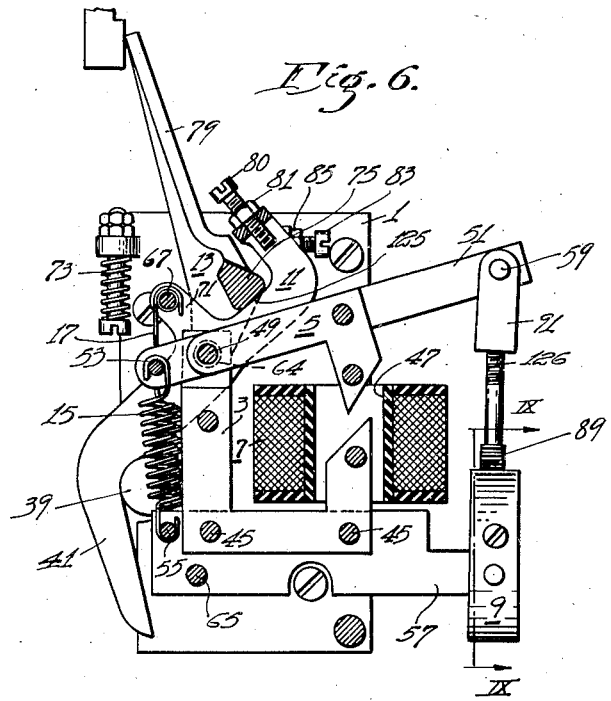
Fig. 6.
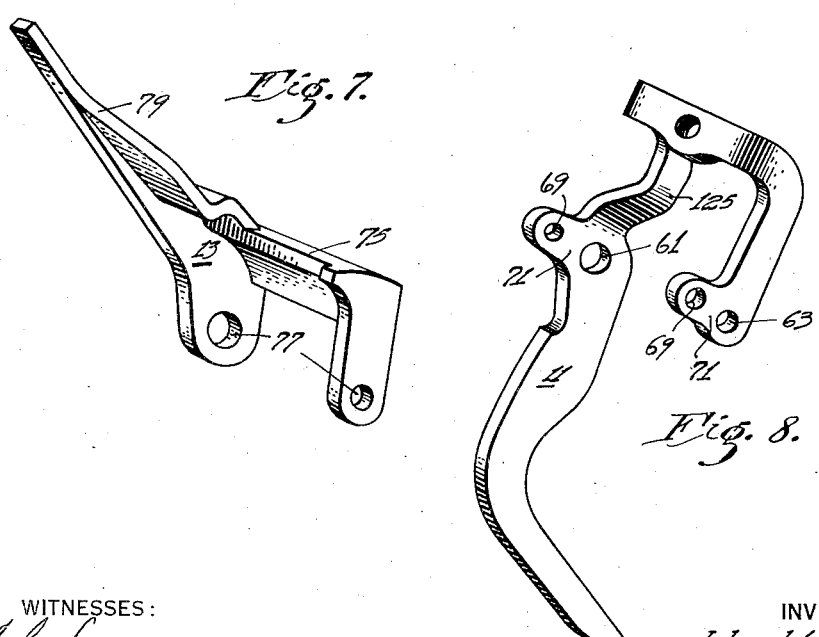
Fig. 7.
Fig. 8.
INVENTOR
Lloyd W. Dyer.

Patented Nov. 10, 1936

2,060,492

UNITED STATES PATENT OFFICE 2,060,492

ELECTRICAL APPARATUS

Lloyd W. Dyer, Swissvale, Pa., assignor to Westinghouse Electric & Manufacturing Company, East Pittsburgh, Pa., a corporation of Pennsylvania Application April 24, 1934, Serial No. 722,098

11 Claims. (Cl. 175—372)

My invention relates generally to electro-responsive mechanism and it has particular application to undervoltage trip devices which are used for controlling the operation of circuit breakers or the like.

The usual form of under voltage trip device for this type of service comprises an armature that is movable to cause the actuation of the device, a spring biasing the armature to the actuated position, and an electromagnetic means for holding the armature against the biasing action of the armature biasing spring. Under normal operating conditions the energization of the electromagnetic holding means is sufficient to prevent the armature from moving under the influence of its biasing spring to cause the actuation of the device. Upon the occurrence of predetermined abnormal conditions in the energizing circuit for the electromagnetic holding means that means becomes incapable of holding the armature against movement by the armature biasing spring, and the armature moves to cause the actuation of the device.

Under-voltage trip devices are frequently used in conjunction with circuit breakers on industrial or moderate power network systems, and while it is imperative that the maximum protection be given to the controlled equipment, it is also desirable that unnecesary and annoying interruptions in the operation of the protected equipment be prevented. In the ordinary circuit of this type it often happens that the power goes off instantaneously or for a comparatively short period of time, due to some unusual operating or load condition, and during the occurrence of these transient interruptions, it is desirable that the circuit breakers which are protected by undervoltage trip devices remain in the closed-circuit position. Therefore, if an undervoltage trip device is to meet all the requirements of the type of service for which such devices are intended, it is necessary that a time delay be introduced into its operation in order that unnecessary discontinuities in the operation of the protected equipment shall be avoided.

In the past, it has been suggested that some means such as a dashpot could be used for accomplishing this desired time delay in the operation of the device. Dashpots, however, are notoriously unsatisfactory devices and when an effort is made to apply them to an undervoltage device, it is found that they can be used under only the most favorable operating conditions. Practically the only commercially successful form of dashpot utilizes a piston which is movable within a cylinder containing oil or some other fluid. As the temperature changes the viscosity of the oil or other fluid also changes, and as a result the time interval and the retarding force of the dashpot vary over very wide limits.

Moreover, a dashpot, unless some very special valve arrangements are provided which make the cost of such a device almost prohibitive, exerts a substantially equal retarding force in both directions. This prevents a quick return of the dashpot plunger to the normal energized position following the termination of a transient abnormal condition, and if the control circuit is subjected to a plurality of successive short interruptions it is very probable that those successive interruptions will cumulatively combine to effect the operation of the trip device.

The principal object of my invention is to overcome the disadvantages which have existed in the devices heretofore known in the art, and to provide a simple, inexpensive and reliable electro-responsive device that shall be operable to cause the actuation of the controlled equipment upon the occurrence and the persistence for a definite time of a predetermined abnormal circuit condition.

In accomplishing this object of my invention I provide a mechanical escapement mechanism for introducing a time delay into the operation of the device. The preferred form of this escapement mechanism is capable of retarding the movement of the armature or other means which causes the actuation of the device through a portion of its movement in only one direction. By virtue of this the improved mechanism of my invention becomes capable of substantially instantaneously restoring itself to the normal energized position, if the abnormal condition does not persist for a sufficient period of time to effect the actuation of the device and the circuit conditions return to normal.

Another object of my invention is to provide an improved means for securing a time delay in the operation of electro-responsive devices generally, my improved means to be substantially unaffected by variations in the ambient temperature.

An ancillary object of my invention is to provide an improved undervoltage trip device which shall be simpler in design, more rugged in construction, and more reliable in operation than the previously known devices of this type.

Referring to the drawings:

Fig. 3 is an enlarged front elevational view of the preferred form of my undervoltage trip device in the energized position.

Fig. 4 is a side elevational view of the device shown in Fig. 3.

Fig. 5 is a front elevational view similar to Fig. 3 showing the trip device of my invention in the tripped position.

Fig. 6 is a sectional view taken on the line VI—VI of Fig. 4, the device being shown in the deenergized position.

Fig. 7 is a perspective view of the trip member used in the preferred embodiment of my invention.

Fig. 8 is a perspective view of the trigger member used in the preferred embodiment of my invention.

Figure 1:
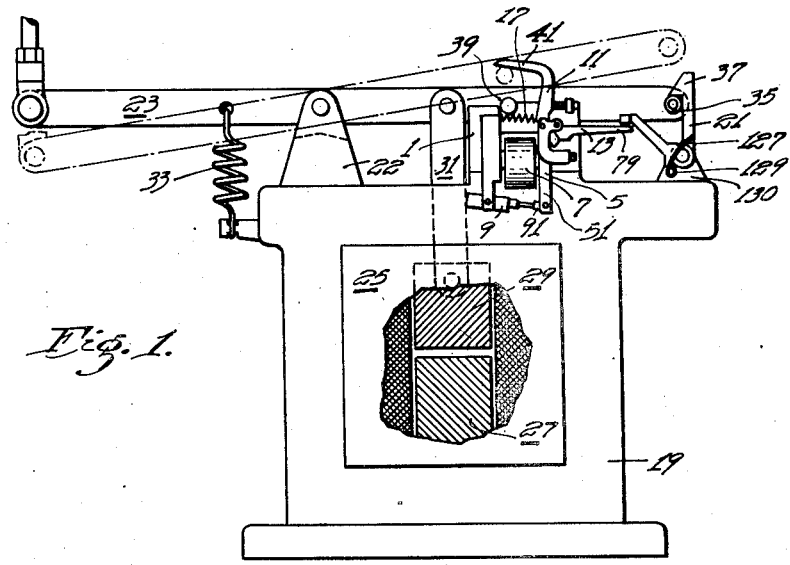
Figure 1 is a fragmentary view showing the preferred embodiment of my electro-responsive trip device in use on a circuit breaker.

The preferred form of the trip device of my invention comprises a base member 1 upon which the various parts of the mechanism are mounted, a core member 3, a pivotally supported armature 5, an energizing coil 7 disposed about one leg of the core member 3, a mechanical escapement means 9 for controlling the movement of the armature 5 away from the core member 3, a pivoted trigger member 11, and a pivoted actuating member 13 which is adapted to be engaged by the trigger member 11 during the operation of the device. The armature is biased away from the coil 7 by means of a suitable spring 15, and a pair of overcenter springs 17 are provided for causing the trigger member 11 to move from the untripped to the tripped position with a snap action.

The particular form of circuit breaker operating mechanism with which the preferred embodiment of my invention is utilized is not an important part of my invention. It is desirable, however, that the operating mechanism shall include means for restoring the trip device to the normal position during the circuit opening operation, and I have illustrated a mechanism of this kind in Figs. 1 and 2. The mechanism comprises a frame or base 19 of suitable material upon which is supported the undervoltage trip device, a pivoted trip latch 21, and a pair of opposed arms 22 adapted to pivotally support the main operating lever 23 for the associated circuit breaker or other equipment. A coil member 25 is positioned about a core 27 supported upon the frame 19 and is adapted to attract an armature 29 mechanically connected to the switch operating lever 23 through a link 31 in order to close the breaker contacts.

The switch actuating lever 23 is biased to the open circuit position by means such as the spring 33 and is adapted to be held in the closed circuit position through the engagement of a roller 35 with the overhanging portion 37 of the trip latch. A pin 39 projects outwardly from the switch actuating lever 23 and is adapted to engage the outer portion 41 of the trigger member 11 in order that undervoltage trip device shall be automatically reset during the opening operation of the breaker. The operating mechanism is shown in the normal closed-circuit position in Fig. 1, and the open-circuit position of the switch actuating lever is indicated in dotted lines in that figure.

The core member 3 for the armature attracting means is substantially L-shaped, as is shown in Fig. 6, and is adapted to be rigidly affixed to a member 43 (Fig. 4) projecting upwardly from the base by means such as the screws 45. The coil 7 is wound upon an insulating spool 47 and is adapted to fit over the upwardly projecting portion of the L-shaped core 3, it being retained in position thereon by any suitable means.

The armature 5 is pivotally supported upon a pin 49, one end of which is rigidly affixed to the base 1 of the trip device by means of a nut 50, and is provided with a pair of opposed metallic strips 51 riveted to the sides thereof. One end of each of these strips projects a short distance beyond the pivot point for the armature in order to provide a support for the pin 53 which serves to mechanically connect the armature biasing spring 15 to the armature. The other end of the armature biasing spring 15 is affixed to another pin 55 supported between similar opposed strip members 57 fastened to either side of the core 3. A pin extends through opposed openings in the other end of the two strips 51 and serves as a means for pivotally connecting the escapement mechanism 9 with the movable armature 5.

The trigger member 11, which is shown particularly in Fig. 8, is of rather complex shape and is provided with two openings 61 and 63 for pivotally engaging the pin 49 which also supports the armature 5. The opening 61 is larger than the opening 63 in order to accommodate the spacing bushing 64 intermediate the core 3 and the frame 1. The overcenter springs 17, one end of each of which is affixed to a pin support 65 extending through opposed openings in the strip members 57 affixed to the core 3, are provided for moving the trigger member from one position to the other with a snap action. As is shown particularly in Fig. 5, the upper portion 66 of each of these springs is uncoiled and is slightly bowed, and the extreme end of each of the springs is bent so as to engage the pin 67 which extends through the opposed openings 69 in the upstanding portions 71 of the trigger member 11. By this arrangement, it is possible to have the line of action of the overcenter trigger springs 17 to the right (Figs. 3 and 5) of the pivot point of the trigger member when the device is in the closed-circuit position, and thus bias that member toward a position where it is incapable of effecting the actuation of the device. The spring stop member 73 serves to limit the clockwise movement of the trigger member 11.

The trip member 13, which is shown particularly in Fig. 7 includes a U-shaped body portion 75 having opposed openings 77 therein and an outwardly projecting portion 79 for actuating the trip latch 21. This member is likewise pivoted upon the main pivot pin 49.

The armature 5 is movable from the position shown in Fig. 3 (the normal attracted position) independently of the other pivoted members to almost the complete extent of its path of movement. Likewise, when the trigger member 11 has been moved by the armature 5 so as to bring the line of action of the overcenter actuating springs 17 to the left of the pivot point therefor (the center of the pin 49), that member is freely movable, independently of the armature 5 and the trip member 13, for a very considerable portion of its path of movement. During the latter portion of its movement to the tripped position the trigger member 11 engages the trip member 13 and causes sufficient movement of that member to actuate the trip latch 21. The amount of relative movement between the armature 5 and the trigger member 11 is controlled by means of a screw 80 and lock nut 81, and the amount of relative movement between the trigger member 11 and the trip member 13 is controlled by means of a similar screw 83 and lock nut 85.

Figures 9, 10:
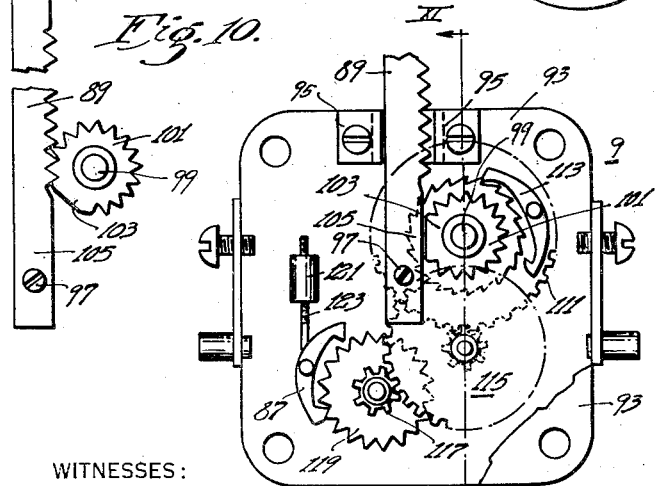
Fig. 9 is an enlarged sectional view taken on the line IX—IX of Fig. 6, showing the details of the mechanical escapement means used for obtaining a time delay in the operation of the device.
Fig. 10 is a fragmentary view of the operating rack and the actuating gear used in the escapement device shown in Fig. 9; and, Fig. 11 is a sectional view on the line XI—XI of Fig. 9.
Figure 11:
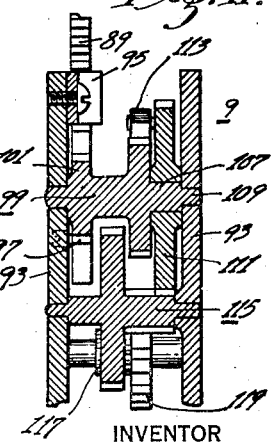

The mechanical escapement mechanism 9 is shown particularly in Figs. 9, 10 and 11 and comprises a pivoted escapement member 87, a movable rack member 89 adapted to be pivotally connected to the movable armature 5 by means of an adjustable tie link 91, and a train of gears intermediate between the escapement member 87 and the rack member 89. The entire mechanism is assembled between a pair of opposed plate members 93, one of which has been cut away in Fig. 9.

The rack member 89 slides within a suitable guide strap 95 affixed to the upper portion of one of the two opposed side plates 93 and is provided with a screw 97 for preventing the rack 89 from disengaging the mechanism. The initial gear 99 of the train intermediate the rack and the escapement is formed as a double element. The upper gear portion 101, as is shown particularly in Figs. 9 and 10, is provided with a flat side 103 adapted to slidably engage the similar flat portions 105 of the rack member 89. This arrangement prevents the double gear member 99 from being rotated more than one complete turn regardless of how far the rack member itself may be moved, since any rotation in excess of that merely causes the flat surfaces of the rack member and the upper gear 101 to slide, one along the other. A definite time interval is thus assured regardless of any excessive relative movement of the rack and gear elements.

The lower portion of the double gear element 99 is provided with an enlarged shaft portion 107 and a smaller pivot portion 109 which engages a pivot opening in the right hand face plate 93. A second gear wheel 111 is journaled upon this enlarged shaft portion 107 and is adapted to move independently of the double gear wheel 99 except as that motion may be controlled by the pawl member 113 affixed to the second gear wheel. This pawl member 113 is adapted to transmit the movement of the double gear wheel 99 which results from the spring produced movement of the armature 5 and the rack member 89 during the normal operation of the device to the escapement means. The pawl member 113 is so arranged, however, that the motion of the rack member 89 and the gear 99 which results from movement of the armature 5 in the direction of the attracting means is not transmitted to the train of gears. A pair of double reducing gears 115 and 117 are arranged to cooperate with the gear wheel 111, and the last of these gears 119 is directly engaged by the escapement member 87. The retarding weight 121 forming a part of the escapement member 87 is threaded, and is thereby movable upon the supporting member 123 affixed to the escapement in order that the time element of the device may be readily varied or adjusted.

It will thus be seen that the escapement mechanism used with this embodiment of my invention is capable of retarding the movement of the armature 5 only when the armature is being moved away from the attracting coil 7 by the armature biasing spring 15, and is incapable of opposing movement of the armature in the direction of the attracting coil. Also by virtue of the fact that the movement of the gears during each operation of the device is definitely limited by the flat side portion 103 of the double gear wheel 99, the time delay introduced into the operation of the device is substantially unvarying. Moreover, changes in the ambient temperature cause practically no change in this normal time interval, since no springs or fluids are used.

Figure 2:
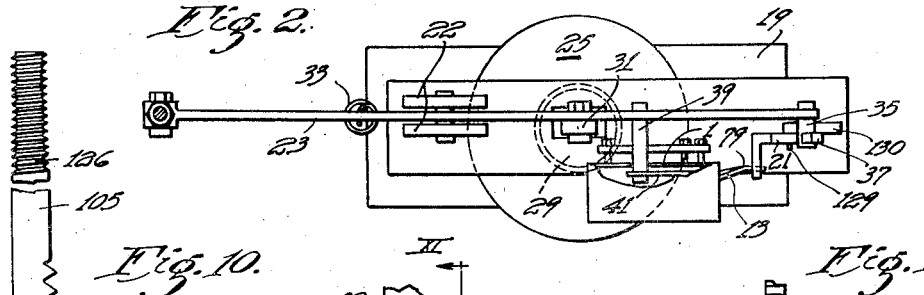
Fig. 2 is a plan view of the structure shown in Fig. 1.

The undervoltage trip device and the circuit breaker operating mechanism are shown in the normal closed-circuit position in Figs. 1 and 2. The main actuating solenoid 25 is normally de-energized, and the energizing coil 7 for the undervoltage device is normally energized in response to the voltage of the circuit controlled by the main breaker. If the voltage of this circuit drops below a predetermined value, the coil 7 and its associated core 3 become incapable of holding the movable armature 5 against the force of the armature biasing spring 15. The armature 5 then begins to move away from the energizing coil 7, its movement being controlled by the escapement means 87, and if the abnormal circuit condition persists for a sufficient interval of time, the double gear 99 is rotated through its maximum permissible rotation whereupon the escapement device 9 becomes entirely incapable of exerting any further retarding effect upon the armature. The armature 5 then becomes free to move under the biasing action of the spring 15, and since the retarding effect of the escapement device 9 is no longer present, the armature moves so as to acquire considerable kinetic energy before it engages the trigger member 11.

Shortly before the limit of motion of the armature away from the coil 7 is reached, the upper surface of the armature engages the lower end of the screw 80 affixed to the trigger member 11 and strikes that member with a sufficient blow to cause the line of action of the overcenter springs 17 to be moved across the pivot point of the trigger member 11. The trigger member then becomes capable of being moved by the overcenter springs to the tripped position, this motion taking place with considerable acceleration which in conjunction with the weight of the trigger member imparts a very large amount of kinetic energy to that member. This kinetic energy is entirely released when the side portion 125 of the trigger member engages the connecting portion 75 of the trip member, and it causes the projecting portion 79 of the trip member 13 to be moved with considerable force to release the trip latch 21.

The switch actuating arm 23 is then free to move under the biasing effect of the opening spring 33 to the open circuit position shown in dotted lines in Fig. 1. As the switch operating lever 23 moves to the open circuit position, the pin 39 is moved from the position shown in Figs. 5 and 6 to the position shown in dotted lines in Fig. 3, and this movement causes the trigger 11 and the trip member 13 to be restored to the normal energized position. The armature 5 is moved at the same time toward the coil 7 but is not entirely restored to the normal energized position, because of the normal lost motion relation. Between the armature and the trigger member the path of movement of the pin 39 is so arranged, with respect to the movement of the trigger member 11, that the line of action of the overcenter springs 17 is always carried to the right of the pivot point of the trigger member with the breaker open.

Thus, the under-voltage trip device will remain in the normal energized position when the breaker is being closed, provided, of course, that the armature 5 is held in the energized position by the attracting coil therefor.

The circuit breaker is normally re-closed following an opening operation by the energizing of the attracting solenoid 25. This energization causes the actuating armature 29 to be moved from the open circuit position to the position shown in Fig. 1, whereupon the roller 35 reengages the overhanging portion 37 of the trip latch 21. The trip latch is biased to the latched position (shown in Fig. 1) by a suitable spring 127, and its movement under the action of that spring is limited by the pin 129 which is affixed to the support arm 130 for the trip latch. After the roller 35 has been relatched by the trip latch 21 the energizing force on the closing solenoid 25 may be removed. If the undervoltage device is properly energized, armature 5 will be held in the normal energized position and the breaker will remain closed. If, however, the energization of the undervoltage trip device is beneath the predetermined normal value, the armature will immediately move away from the attracting coil 7 to cause the breaker to open.

The escapement mechanism 9 utilized for producing a time delay in the operation of the device is so arranged as mentioned above, that the movement of the armature 5 is retarded in only one direction. Thus, if the abnormal condition which causes the attracting coil 7 to become incapable of holding the armature 5 against the attraction of the armature biasing spring 15 persists for an insufficient interval of time to allow the double actuating gear 99 for the escapement to be rotated the entire possible distance, the attracting means will become capable of moving the armature 5 to itself against the armature biasing spring. The escapement mechanism by virtue of the arrangement of the pawl 113, will in no way retard this movement and as a result, if the abnormal condition does not persist for a sufficient interval of time to affect the actuation of the trip device, the entire mechanism is substantially instantaneously restored to an operative condition. This prevents the opening of the breaker from taking place except after an abnormal condition capable of affecting the actuation of the trip device has persisted for a predetermined interval of time, and a number of successive transient conditions will not cause the opening of the controlled circuit, as is the case of dashpot controlled devices.

Under certain conditions it may be desirable to decrease the time during which the escapement mechanism 9 exerts a retarding effect upon the movement of the armature 5 to a value less than the time produced by a complete rotation of the double gear wheel 99. This reduction may be effected by changing the normal position of the link 91 on the threaded end 126 of the rack 89, so as to cause only some of the rack teeth to engage the double gear 99 during each operation of the device. The time delay although reduced will still be constant, because the armature 5 when attracted to the core 3 comes to rest at a definite position and thus assures a uniform movement of the rack 89.

From the foregoing it will be seen that I have disclosed a new and improved electro-responsive device which is particularly suitable as an undervoltage trip device for use in controlling the operation of circuit breakers or the like. My improved electro-responsive device is capable of causing the actuation of the controlled equipment only after the predetermined abnormal conditions bringing about the operation having persisted for a definite period of time, and upon the restoring of the circuit to its normal condition the device automatically and instantaneously restores itself to the normal condition. Moreover, I have disclosed an improved time delay device in combination with electrical apparatus of this type which is substantially unaffected by changes in the ambient temperature, and which is, therefore, much more reliable and satisfactory in operation than the previously known dashpot devices.

I have also described certain improved structural arrangements, and certain combinations of structural elements, which I have found particularly desirable in carrying out the objects of my invention.

While in accordance with the patent statutes, I have disclosed the foregoing details of a preferred embodiment of my invention, it is to be understood that so far as the broad principle involved is concerned, many of these details are merely illustrative and that variations in their precise form will be apparent to those skilled in the art. It is my desire, therefore, that the language in the accompanying claims shall be accorded the broadest reasonable construction, and that my invention shall be limited only by what is expressly stated therein and by the prior art.

I claim as my invention:

1. In an electro-responsive device, a pivoted armature, a pivoted trigger, an overcenter spring for moving said trigger with a snap action, a third pivoted member movable to actuate said device, and an electro-responsive means for causing the actuation of said device upon the occurrence of predetermined conditions, said armature, during the actuation of said device, moving to gain appreciable kinetic energy and then striking said pivoted trigger with sufficient force to cause the line of action of said overcenter spring to move across the pivot point of said trigger, said trigger being then moved by said spring for a predetermined distance when it engages and moves said third pivoted member with considerable force to actuate said device.

2. In an electro-responsive device, a pivoted armature movable between two positions, a spring for biasing said armature to one of said two positions, electro-magnetic means for holding said armature against movement by said biasing means, a pivoted trigger member, an overcenter spring for moving said trigger member with a snap action, a third pivoted member movable to actuate said device, and means associated with said movable armature for introducing a time delay into the operation of said device, said electro-magnetic means causing said armature to be moved by said biasing means upon the occurrence of predetermined conditions to cause said over-center spring to move said trigger with a snap action, said trigger then moving to gain considerable kinetic energy and finally engaging and moving said third member to actuate said device.

3. In an electro-responsive device, an operating member movable from a normal inoperative position to an operative position to effect the actuation of said device, a trigger member movable from an untripped position to a tripped position to move said operating member to said operative position, means normally biasing said trigger member to the untripped position, and electro-responsive means operable to cause said biasing means to move said trigger member from the untripped to the tripped position, said electro-responsive means including a member movable from a normal inoperative position to a position where it causes said biasing means to move said trigger member to the tripped position, means biasing said member to said operative position, electro-responsive means for preventing said biasing means from moving said member, except upon the occurrence of predetermined conditions, and means for retarding the movement of said member during the initial portion but only during that portion of its movement from said inoperative to said operative position, said retarding means introducing a time delay into the operation of said device while at the same time allowing said member to move freely during the latter portion of its movement to actuate said electro-responsive means.

4. In an electro-responsive device, an operating member movable from a normal inoperative to an operative position to effect the actuation of said device, a trigger member movable from a normal untripped position to a tripped position to move said operating member to said operative position, a spring which normally biases said trigger to said untripped position, and electro-responsive means operable to cause said spring to move said trigger member from the untripped to the tripped position with a snap action, said electro-responsive means including an armature which is movable from a normal inoperative position to an operative position to cause said spring to move said trigger member to the tripped position, a spring means normally biasing said movable armature to said operative position, electromagnetic means for retaining said armature in the inoperative position against the force of said biasing spring except upon the occurrence of predetermined conditions, and a mechanical escapement means operable during only the initial portion of the movement of said armature from said inoperative to said operative position for introducing a time delay into the operation of said device, said escapement means acting during only a portion of the movement of said armature in order that that member may move freely under the biasing action of the said biasing spring therefor during the final portion of its movement to said operative position.

5. In an electro-responsive device, a member movable from a normal inoperative position to an operative position to effect the actuation of said device, a trigger member movable to an untripped position and to a tripped position, said trigger member, when moved from said untripped to said tripped position, being adapted to engage said actuating member and to move that member from said inoperative to said operative position, spring means normally adapted to bias said trigger member to the untripped position, and electro-responsive means for controlling the operation of said device, said electro-responsive means including means movable to cause said spring means to move said trigger member from said untripped position to said tripped position and thereby move said movable member to effect the operation of said device, means for preventing movement of said movable means except upon the occurrence of predetermined conditions, and means for introducing a time delay into the operation of said device.

6. In an electro-responsive device, a member movable from a normal inoperative position to an operative position to effect the actuation of said device, a pivotally supported trigger member movable to an untripped and to a tripped position, said trigger member, when moved from said untripped to said tripped position, being adapted to engage said actuating member and to move that member from said inoperative to said operative position, a spring means which normally biases said trigger member to said untripped position, and electro-responsive means for controlling the operation of said device, said electro-responsive means including an armature which is movable to cause sufficient shift between the line of action of said spring means and the pivot point of said trigger member to cause said spring to move said trigger member from said untripped to said tripped position and thereby move said actuating member to effect the actuation of said device, and means for preventing movement of said armature except upon the occurrence of predetermined electrical conditions.

7. In an electro-responsive device, an operating member movable from a normal inoperative position to an operative position to effect the actuation of said device, a trigger member movable to an untripped and to a tripped position, said trigger member, when moved from said untripped to said tripped position, being adapted to engage said operating member and to move that member from said inoperative to said operative position, an under-voltage element, and means actuable in response to the operation of said under-voltage element to move said trigger member from the untripped to the tripped position with a snap action, said under-voltage element including an armature movable from a normal inoperative position to an operative position to cause said means for moving said trigger member to move that member from the untripped to the tripped position, means biasing said armature to said operative position, and an electromagnetic means for normally retaining said armature in the operative position against the force of said biasing means.

8. In an electro-responsive device, an operating member movable from a normal inoperative position to an operative position to effect the actuation of said device, a pivotally supported trigger member movable to an untripped position and to a tripped position, said trigger member, when moved from said untripped to said tripped position, being adapted to engage said operating member and to move that member from said inoperative to said operative position, an overcenter spring, the line of action of which normally lies to one side of the pivot point of said trigger member in order to bias that member to the untripped position, and an under-voltage element for controlling the operation of said electro-responsive device, said under-voltage element including an armature movable from a normal inoperative position to a position where it causes the line of action of said overcenter spring to be moved to the opposite side of the pivot point of said trigger member, in order that said trigger member shall be moved by said spring from the untripped to the tripped position with a snap action, means for biasing said armature to said operative position, and electromagnetic means for holding said armature in said normal inoperative position except upon the occurrence of predetermined conditions.

9. In an electro-responsive device, an operating member movable from a normal inoperative position to an operative position to effect the actuation of said device, a trigger member movable to an untripped and to a tripped position, said trigger member, when moved from said untripped to said tripped position, being adapted to engage said operating member and to move that member from said inoperative to said operative position, spring means normally adapted to bias said trigger member to said untripped position, and electro-responsive means for controlling the operation of said device, said electro-responsive means including an armature movable upon the occurrence of predetermined conditions to gain considerable kinetic energy and to then expend that energy in effecting sufficient movement of the line of action of said spring means, with respect to said trigger member, to cause said spring means to move said trigger member to said tripped position, said trigger member, when it is being moved from said untripped position to said tripped position by said spring means, engaging said operating member with considerable force in order to assure positive actuation of said device.

10. In an electro-responsive device, a frame member, a core supported thereupon, an energizing coil for said core, a movable armature normally adapted to be attracted to said core, an operating member movable from a normal inoperative position to an operative position to effect the actuation of said device, a trigger member, movable to an untripped and to a tripped position, disposed intermediate said movable armature and said operating member, said operating member, said trigger member and said armature being supported on said frame in such manner that they are movable independently of one another, means biasing said armature away from said core, and means normally biasing said trigger member to said untripped position, said armature moving independently of said trigger and said operating member upon the occurrence of predetermined conditions to acquire considerable kinetic energy and then expending this energy in causing said biasing means for said trigger member to move that member from said untripped to said tripped position with a snap action, said trigger member engaging said operating member during its movement from said untripped to said tripped position so as to move that member from said inoperative to said operative position with considerable force.

11. In electrical apparatus, a frame member, a core supported thereon, an energizing coil for said core, an armature normally adapted to be attracted to said core, an operating member movable from a normal inoperative position to an operative position to effect the actuation of said device, a trigger member disposed intermediate said armature and said operating member, said operating member, said armature, and said trigger member being supported upon a common pivot pin and being so arranged that each member is independently movable wth respect to the other, and means for moving said armature and said trigger member during each operation of said device, said armature being moved by said last mentioned means, independently of said trigger member and said operating member, for a predetermined distance, and then engaging said trigger member to cause that member to be set in motion by said means for moving that member, said trigger member thereupon being moved a predetermined distance by said means independently of said operating member, and then engaging and moving said operating member from said inoperative to said operative position to effect the operation of the device.

LLOYD W. DYER.